(12) United States Patent
Rudolph et al.

(10) Patent No.: US 6,188,447 B1
(45) Date of Patent: Feb. 13, 2001

(54) FREQUENCY DIVERSITY SYSTEM

(75) Inventors: Georg Rudolph, Seelze; Michael Daginnus, Braunschweig; Ralf Bösche, Hannover, all of (DE)

(73) Assignee: Fuba Automotive GmbH, Bad Salzdetfurth (DE)

( * ) Notice: Under 35 U.S.C. 154(b), the term of this patent shall be extended for 0 days.

(21) Appl. No.: 08/918,842

(22) Filed: Aug. 26, 1997

(30) Foreign Application Priority Data

Sep. 13, 1996 (DE) .............................. 196 37 327

(51) Int. Cl.[7] .............................. H04N 5/46; H04B 1/06; H04B 17/02
(52) U.S. Cl. ..................... 348/729; 348/731; 348/735; 348/553; 455/133; 455/135; 455/277.1; 455/277.2
(58) Field of Search .................... 348/731, 732, 348/735, 725, 553, 554; 455/133, 135, 134, 6.1, 6.3, 277.1, 277.2, 278.1, 33; 370/529, 487; H04B 1/06, 17/02; H04N 5/46

(56) References Cited

U.S. PATENT DOCUMENTS

| | | | | |
|---|---|---|---|---|
| 4,450,585 | * | 5/1984 | Bell | 455/135 |
| 5,159,596 | * | 10/1992 | Itoh | 379/60 |
| 5,291,519 | * | 3/1994 | Tsurumaru | 375/12 |
| 5,303,396 | * | 4/1994 | Ooyagi | 348/725 |
| 5,313,660 | * | 5/1994 | Lindenmeier | 455/135 |
| 5,335,010 | * | 8/1994 | Lindenmeier | 348/706 |
| 5,559,838 | * | 9/1996 | Nakagoshi | 375/347 |
| 5,949,796 | * | 9/1999 | Kumar | 370/529 |

FOREIGN PATENT DOCUMENTS

| | | |
|---|---|---|
| 15 91 144 | 7/1970 | (DE) . |
| 28 40 533 | 2/1980 | (DE) . |
| 37 32 398 | 4/1988 | (DE) . |
| 40 06 295 | 9/1990 | (DE) . |
| 39 26 336 | 2/1991 | (DE) . |
| 41 11 847 | 10/1991 | (DE) . |
| 41 19 398 | 2/1992 | (DE) . |
| 41 01 629 | 7/1992 | (DE) . |
| 41 29 830 | 3/1993 | (DE) . |
| 195 18 368 | 2/1996 | (DE) . |
| 2-81887 | 3/1992 | (JP) . |

\* cited by examiner

*Primary Examiner*—Mark R. Powell
*Assistant Examiner*—Wesner Sajous
(74) *Attorney, Agent, or Firm*—Collard & Roe, P.C.

(57) ABSTRACT

A frequency diversity system for use in mobile reception of television and RF signals in the meter or decimeter wavelength, such as for use with a mobile television having a first receiver, an additional receiver and a control and analysis circuit. The additional receiver detects all incoming frequencies corresponding to a preset program and switches the main receiver to an incoming frequency of a higher quality. The receiver is able to identify the frequencies corresponding to the desired program through a transmitter identification code, which is added to each signal. This code is usually a VPS identification signal. The control and analysis circuit compares the incoming frequencies to the frequency of the signal transmitted by the television receiver to determine the highest quality signal. In order to accelerate the process, the system processes local position coordinates of the television so that the frequencies analyzed are only those expected within the coverage area of the television.

8 Claims, 1 Drawing Sheet

FREQUENCY DIVERSITY SYSTEM

BACKGROUND OF THE INVENTION

1. Field of the Invention

The invention relates to a frequency diversity system for mobile reception of high frequency UHF or VHF signals. In particular, the invention relates to a frequency diversity system for mobile television reception in the meter or decimeter wavelength.

2. The Prior Art

Frequency diversity, especially as it relates to television reception, has not as yet been fully established. Thus, there are no receivers which automatically select between two emitted frequencies corresponding to one television program within a certain coverage area, and which are able to switch the reception to a channel with superior signal quality. Nor is there the possibility of a supra-regional selection between more than two different frequencies with one television program, such as has been used for radio in the form of Radio Data Systems (RDS). For radio, RDS, besides spacial diversity, is a basis for interference-free and continuous high-quality reception during long car trips. To date, nothing comparable is available for television broadcasting.

In television technology, the normal system uses a predetermined number of transmitters with one frequency, each stored inside the receiver, whereby the frequency can be accessed manually by selecting a certain receiving channel. This principle will not work for television reception in moving vehicles, at least at the boundaries of the coverage area, due to the weakening of the actually-received signal, and also for other well-known reasons, such as fading, multipath reception, interferences, etc.

Moreover, it is known that diversity circuits may cause a deterioration of the trueness of the picture or reproduction, i.e., interference noises during changeover between antennas or frequencies, especially during switching back and forth between signal paths, when the signal quality on the available channels is approximately the same. This is especially true for the more complicated operational conditions of television compared to audio radio. Thus, in addition to continually providing a signal with sufficiently high signal level and signal-to-noise ratio, a stable field synchronization as well as a synchronization between image and sound must be guaranteed. Thus, whenever the diversity principle is to be utilized in a moving vehicle to improve reception, care must be taken to ensure that the advantages obtained through greater expenditure will not be impeded by defects in the diversity function itself.

SUMMARY OF THE INVENTION

It is therefore an object of the present invention, when utilizing the frequency diversity principle, to create a system for mobile, stable and interference-free reception of television programs which are transmitted simultaneously in several coverage areas and on different frequencies.

It is another object of the invention to provide a system wherein any expenditures connected with the introduction of an additional program identification are avoided, and interference and side effects of the diversity function are reduced or eliminated as much as possible.

This object and others are achieved according to the invention by a frequency diversity system for use in mobile reception of RF signals in the meter or decimeter wavelength. The system is used with a mobile television receiver, with an additional receiver, and a control and analysis circuit. The additional receiver detects all incoming frequencies corresponding to a preset program, and switches the main receiver to an incoming frequency of a higher quality.

The receiver is able to identify the frequencies corresponding to the desired program through a transmitter identification code, which is added to each signal. This code is usually a VPS identification signal.

The control and analysis circuit compares the incoming frequencies to the frequency of the signal used by the television's main receiver to determine the highest quality signal. In order to accelerate the process, the system processes local position coordinates of the television so that the frequencies analyzed are only those expected within the reception coverage area of the television.

The frequency of the television's main receiver is switched to an alternative frequency by a control pulse, which also switches the signal path between the main receiver and the additional receiver. When a better signal is detected by the additional receiver, the control pulse switches the signal path to the additional receiver, which then directs the signal through the television until the frequency of the main receiver is switched to the new frequency. This ensures continuous reception without interruptions due to the switching process.

The system is also equipped with preset operating thresholds for selected criteria. These thresholds ensure that when there are two signals of approximately equal quality, there is no switching back and forth between transmitters on the available frequencies. This measure ensures response by the analysis and control circuit, as well as the generation of the control pulse only when a signal of higher quality is detected.

The identification of signals can also be accomplished by taking and comparing a sample of the signals at identical positions in relation to synchronous pulses. The compared components may include video text, brightness, color, and audio signals, as well as the quality of added subtitles. The selected components are preferably subjected to low pass filtration, to eliminate interferences of a higher frequency level.

Alternatively, instead of a specific comparison of the components taken from the desired signal, the spectral composition or envelope of one component, such as the audio signal, is compared. If the audio signal envelope is compared, for example, approximately 50 measurements or tests per second are taken. The comparison is then obtained by differentiation between the signals. The signals are assumed to belong to the same program if, during a given period of time, a given average maximal value of the difference between the signals has not been exceeded.

In an alternative embodiment, the signals are compared by cross-correlation, wherein the measurements are taken at such points in time where the signals to be compared are substantially interference-free and there is no modulation interval. The identity of the signal is assumed once the value resulting from cross-correlation is one-half of that of auto-correlation.

In another alternative embodiment, the television has several receivers to separately process varying signal components, i.e., separate receivers for the picture and sound. In this case, separate diversity systems are used on each reception path. Thus, one diversity receiver can select the best picture frequency and the other can select the best sound frequency for the preset program.

The object of the invention is to provide for the automatic recognition of alternative frequencies for a preset television program, and thus the utilization of frequency diversity during the reception of television programs in moving vehicles.

For the purpose of comparison, the invention embodies in its simplest case, the utilization of a program identification code, i.e. of the VPS signal (if available) as well as the utilization of certain selected components of the audio and video signals. Thus, the invention may be used independently of the presence of definite information, including the address part within the transmitted frequency band. In addition, the invention may be used without any additional expenditures on the transmitter side, or supplements to or modifications of the signal for detecting specific programs.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
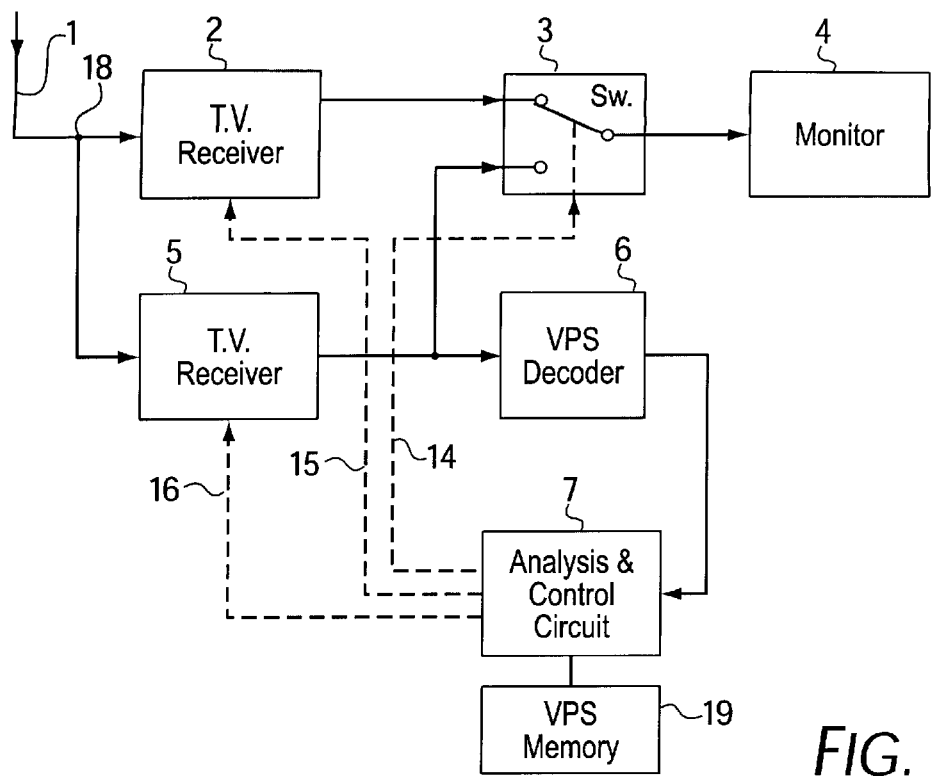
FIG. 1 is a block diagram of a frequency diversity system for mobile television reception according to the invention.

Referring now in detail to the drawings and, in particular, FIG. 1, there is shown a receiver 2 for audio and video reproduction found in any television set. In order to provide a frequency diversity function, a second receiver 5 is provided. Both receivers are connected to a reception antenna 1 by a hybrid connection. The hybrid circuit 18 has its input connected to antenna 1 and its two isolated outputs are connected to receivers 2 and 5. As is typical with hybrid circuits, the hybrid outputs reduce the signal strength of antenna 1 about 3 db to each receiver. However, the two inputs are isolated from each other about 20–30 db, so that the inputs of each receiver are independent of each other.

With the set switched on, receiver 5 of the diversity circuit, independently from the signal processing by main receiver 2, searches the entire transmission range for other transmitters or television stations carrying the program in question. Once a second transmitter or station has been found, the search mode if receiver 5 is stopped and the incoming signal is delivered to VPS decoder 6. If it is a signal with a VPS-identification code, then the identification is compared to the VPS identification of the transmitter operating via main receiver 2. At the same time, the analysis and control circuit 7 tests and compares the reception quality of the two transmitters. Control circuit 7 has preset operating thresholds for sensing the RF signals from two or more transmitters. If the identification codes are compatible, and if the reception quality of reference transmitter 5 is of superior quality, then main receiver 2 is switched to the new frequency. Immediately before the changeover, monitor 4 is connected to receiver 5 by means of signal source switch 3, and receiver 5 operates as the main receiver during the transient response period of receiver 2. After this transient period, switch 3 is again actuated and receiver 5 of the diversity circuit continues searching. Control circuit 7, which senses the quality of the received signals, operates switch 3 via line 14, and also switches the functions of receivers 2 and 5 via lines 15 and 16, respectively.

Moreover, the analysis and control circuit 7 has an additional function: It stores all detected transmitters with their VPS-identification codes, plus the present signal quality in a non-volatile programmable memory 19. The stored information is included in the ongoing test-and-comparison process. Thus, there is no need for a separate VPS-decoder for main receiver 2.

Concurrently with the search across the entire frequency range, which requires a certain amount of time, the frequencies whose identification matches the signal are sequentially checked in regular intervals via receiver 2. Because of this selection and the comparison, which is limited to the preferred transmitters or stations, the system is able to react much faster than normal to any changes in reception conditions.

Figure 2:
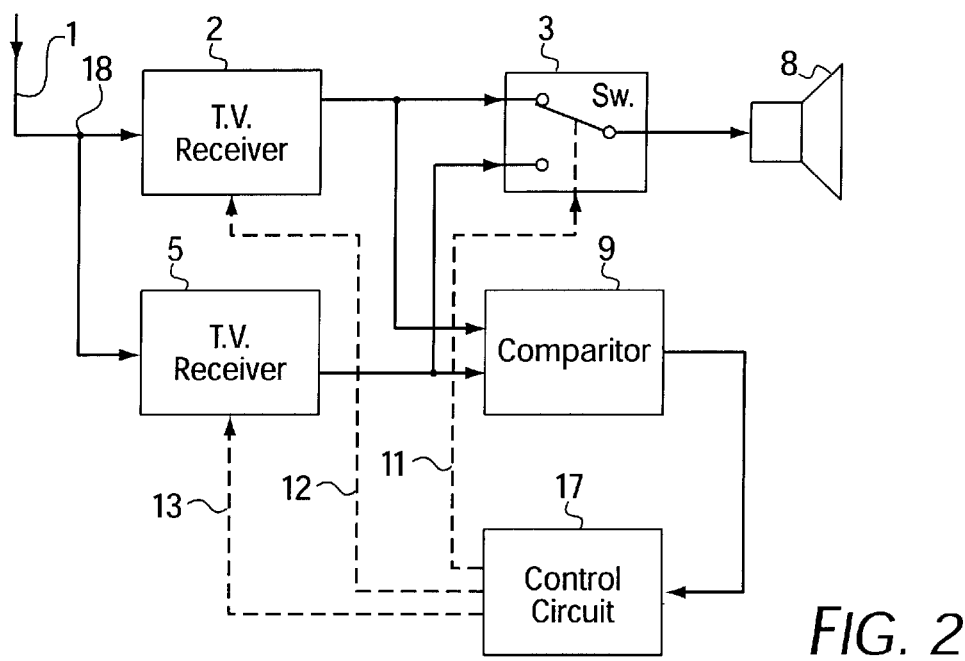
FIG. 2 is a diversity system such as shown in FIG. 1, for audio radio reception.

FIG. 2 shows a frequency diversity system according to the invention for audio-only reception, which operates basically in the same manner as the arrangement shown in FIG. 1. The only difference is that here, the output signals of both the main receiver 2 and of receiver 5 of the diversity circuit are processed for audio reception by speaker 8. The output signals of both receivers are then fed to the input of comparitor 9 which, in turn, reevaluates the signals, and accordingly generates the corresponding pulse for control circuit 17. Control circuit 17, in a manner similar to control circuit 7, will then trigger switch 3 via line 11 to connect speaker 8 to receiver 5. Circuit 17 will also trip receiver 2 via line 12 to tune into the same new station. As soon as receiver 2 locks on the same station as receiver 5 is tuned to, control circuit 17 will trip switch 3 via line 11 to reconnect receiver 2 to speaker 7, and trip receiver 5, via line 13 to then scan available frequencies or stations received on antenna 1. This system is useful when the television is equipped with separate receivers for picture and sound.

Accordingly, while only two embodiments of the present invention have been shown and described, it is obvious that many changes and modifications may be made thereunto without departing from the spirit and scope of the invention according to the appended claims.

What is claimed is:

1. A frequency diversity system for RF and television signal reception from an antenna in the meter or decimeter wavelength range for use with a mobile television having a main receiver connected to the antenna for showing via its monitor, the selected program comprising:

a second receiver connected to the antenna and adapted to detect different signal frequencies of the selected program, said second receiver having means for identifying the selected program from frequencies of other programs;

a control circuit coupled to said main receiver and said second receiver for comparing the signal reception quality of said receivers and generating a control pulse in response to the signal quality;

switch means having its input coupled to said receivers and its output coupled to the television monitor, and having its trigger circuit coupled to said control circuit for switching the monitor between said main and said second receiver in response to said control pulse;

wherein said control circuit has preset operating thresholds for a selected quality reception and said control circuit processes local position co-ordinates of the television so that the frequencies analyzed are only those expected within the reception coverage area of the television in order to prevent the main receiver from switching between frequencies of approximately equal quality.

2. A frequency diversity system for rf and television signal reception from an antenna in the meter or decimeter wavelength range for use with a mobile television having a main receiver connected to the antenna for showing via its monitor, the selected program comprising:

a second receiver connected to the antenna and adapted to detect different signal frequencies of the selected program, said second receiver detecting a transmitter identification code so as to identify the selected program from frequencies of other programs;

a control circuit coupled to said main receiver and said second receiver for comparing the signal reception quality of said receivers and generating a control pulse in response to the signal quality;

switch means having its input coupled to said receivers and its output coupled to the television monitor, and having its trigger circuit coupled to said control circuit for switching the monitor between said main and said second receiver in response to said control pulse;

wherein said control circuit has preset operating thresholds for a selected quality reception in order to prevent the main receiver from switching between frequencies of approximately equal quality.

3. The frequency diversity system according to claim 2, wherein the transmitter identification code is a VPS identification signal.

4. The frequency diversity system according to claim 1, wherein the means for identifying the selected program comprises a system for comparing and evaluating the RF characteristics of the signals of different frequencies.

5. The frequency diversity system according to claim 1, wherein the control and circuit samples synchronous signal components at identical positions said signal components being selected from the group consisting of video text, brightness, color, audio signals and subtitle quality, wherein said signal components have been subjected to low-pass filtration to eliminate interferences of a higher frequency level.

6. The frequency diversity system according to claim 1, wherein the means for identifying the selected program comprises a system for measuring the envelopes of different signals at about 50 measurements per second and measuring the difference between envelopes of different signals, wherein two signals are determined to belong to the same program if over a certain period of time, the difference between the envelopes of the two signals does not exceed a given average maximal value.

7. The frequency diversity system according to claim 1, comprising more than one main receiver, and comprising multiple frequency diversity systems coupled to each of said main receivers for separately processing different signal components, said frequency diversity systems adapted to detect and switch the main receivers separately to the optimal picture frequency and optimal sound frequency for the preset program.

8. The frequency diversity system according to claim 1, wherein the mean value of the signals are compared by means of cross-correlation, the measurements being taken at such points in time when the signals to be compared are substantially interference-free, and with no modulation interval, the identity being assumed once the value resulting from a cross correlation approximates half of that of the autocorrelation.

* * * * *